INVENTOR
Tadayuki Goda
BY Otto John Munz,
ATTORNEY

United States Patent Office

3,368,954
Patented Feb. 13, 1968

3,368,954
**PROCESSES FOR PRODUCING NEW POLY-
SACCHARIDE-LIKE SUBSTANCES**
Tadayuki Goda, 16, 2-chome Akasaka Aoyamaminami-
cho, Minato-ku, Tokyo, Japan
Filed Jan. 3, 1964, Ser. No. 335,640
5 Claims. (Cl. 204—160.1)

ABSTRACT OF THE DISCLOSURE

A process for producing a new polysaccharide-like substance which comprises irradiating with specific, yet different, ray wavelengths successively a mixture of carbon dioxide, water and aluminum silicate while circulating said mixture through a highly purified quartz tube.

---

Figure 1:
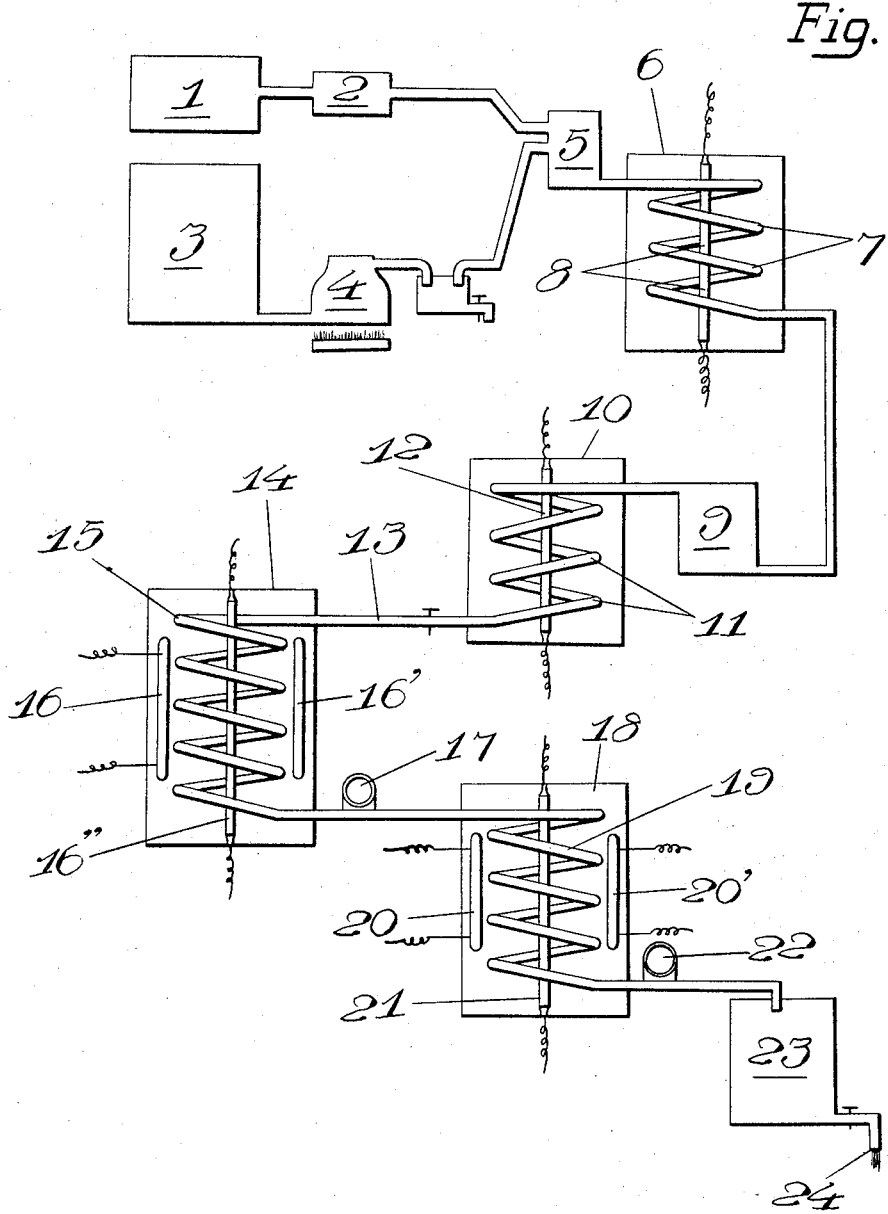

This invention relates to a process for producing new starch. More particularly, it is concerned with a process for producing new starch corresponding macromolecular polysaccharide which comprises irradiating active carbon dioxide and pure water in the presence of a special catalyst such as, for example, a catalyst prepared by irradiation treatment of aluminum silicate micropowders with a ray of wavelength between 370–140 m$\mu$ emitting potent electromagnetic waves, successively with a ray of wavelength between 270–150 m$\mu$ emitting electromagnetic waves to form formaldehyde, with a ray of wavelength between 470–370 m$\mu$ involving a ray of yellow light to form aldose, with a ray of wavelength between 120–60 m$\mu$ emitting electromagnetic waves and a ray of wavelength between 140–112 m$\mu$ emitting electromagnetic waves to form ketose in a portion, and then with a ray of wavelength between 470–20 m$\mu$ involving a ray of yellowish orange light or, if necessary, repeatedly with an adequate combination of the aforementioned rays involving rays, of yellow and yellowish orange light to control the temperature.

Summary of the invention

It is an object of this invention to provide a process for producing starch by photosynthesis. Other objects of this invention will be made clear as the description of this invention proceeds.

Description of the preferred embodiments

I have now discovered as a result of my laborious and long repeated investigations, for the elucidation of in vivo formation of starch by the phytogenic assimilation reaction and on the artificial development of the assimilation reaction that carbohydrate compounds corresponding, to a new starch may be easily produced in accordance with photosynthesis from carbon dioxide, water and a catalyst, though the theoretical background is uncertain. I have achieved the present invention on the basis of the above-described finding.

The present invention is described below as individual steps involved for convenience's sake. However, it is to be understood that the present invention may be ascribed to the synthetic actions of a series of steps. Irradiation of rays of different wavelengths in the given order of steps most preferably gives rise to synthesis of a new starch though the actual feature produced by the use of ray in each step cannot be exactly expressed.

In accordance with my invention:

First, a mixture of carbon dioxide and vaporized water is charged and circulated through a highly purified quartz tube in the presence of a catalyst such as, for example, aluminium silicate powders irradiated with a ray of wavelength between 370–140 m$\mu$ emitting electromagnetic waves while irradiating the tube with a ray of wavelength between 270–150 m$\mu$ to form compounds with an aldehyde radical corresponding to formaldehyde. The ray used in this step is a ray emitted by applying electricity of adequate high-voltage to a pure quartz luminous tube consisting of mercury admixed with minimum amounts of selenium xerox and thorium sealed therein in vacuo.

The second step of this invention involves circulating a mixture of the carbohydrate containing aldehyde radical formed as described above from carbon dioxide, water and a catalyst of pure aluminium silicate thoroughly irradiated with an ultraviolet ray involving a portion of visible light through a pure quartz pipe while, successively irradiating the pipe with a ray having a wavelength between 470–370 m$\mu$ and rays of wavelengths between 120–60 m$\mu$ and between 180–112 m$\mu$, that is, a ray involving rays of yellow light and rays emitting electromagnetic waves, to form carbohydrates corresponding to aldose. In this case, the ray is irradiated as ray emitted by high voltage electric discharge in vacuo of a quartz luminous tube consisting of thorium, lithium, mercury and selenium tightly sealed therein with high evacuation.

Then, the carbohydrate corresponding to aldose formed as above is circulated through a quartz pipe while irradiating the pipe mainly with a ray of wavelength between 470–230 m$\mu$ involving a ray of yellow light and a ray of wavelength between 120–60 m$\mu$ as well as with a ray of wavelength between 180–112 m$\mu$ emitting electromagnetic waves to form carbohydrates corresponding to ketose in a portion. The ray used in this step is one emitted from a luminous body consisting of cadmium, mercury and germainum tightly sealed with evacuation in a quartz valve.

Furthermore, in order to polymerize the carbohydrate mixture partly containing converted carbohydrate corresponding to ketose to macromolecular compounds, the carbohydrate mixture is circulated through a pure quartz pipe in a room with magnetic field while irradiating the pipe with a ray of wavelength between 470–20 m$\mu$ to produce carbohydrates belonging to macromolecular polysaccharide and corresponding to starch. It is most preferable for the above synthesis to use a ray obtained from the following structure; A mixture of potassium, mercury and thorium is tightly sealed in a pure quartz tube followed by evacuation; a small amount of argon is then introduced and the valve is tightly sealed for electric charge; a mixture of lithium, mercury, selenium and cadmium is tightly sealed in a pure quartz tube followed by evacuation to vacuum state; then xenon is introduced and the valve is tightly sealed for electric charge. These two luminous tubes are charged with high voltage electricity to emit a ray for the above-mentioned irradiation.

The present invention will be described and illustrated in greater detail by an example described hereinafter with reference to the accompanying drawing, wherein; FIG. 1 illustrates a flow chart of the process of the present invention and FIG. 2 illustrates a cross section of a mixer used in the process.

In FIG. 1, an iron vessel 1 is shown in which liquefied carbon-dioxide is placed, and there are also employed a vessel 2 for purification of the gas, a tank 3 for pure water, an equipment 4 for the vaporization of water, a mixer 5, a first synthesis chamber 6, a quartz pipe 7, a luminous tube 8, a transfer pipe 9, a second synthesis chamber 10, a quartz pipe 11, a luminous tube 12, a transfer pipe 13, a third synthesis chamber 14, a quartz pipe 15, luminous tubes 16, 16' and 16", a transfer pump and pipe 17, a polymerization chamber 18, a quartz pipe 19, combination luminous tubes 20, 20' and 21, transfer pump and pipe 22, a storage means of the product 23 and an outlet 24 of the product.

Figure 2:
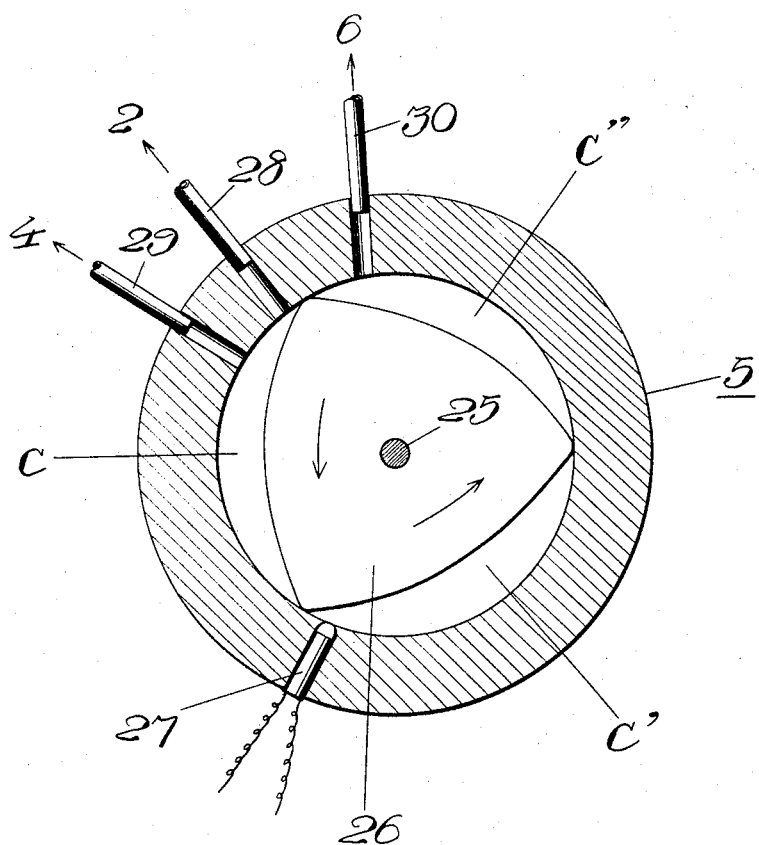

In FIG. 2, there are shown a shaft 25, a rotor 26, a luminous body 27, conduits 28, 29 and 30, and compartments C, C" and C"' divided by the rotor 26.

In the example illustrated below the following mechanism of chemical reactions presumably exists:

If activated $CO_2 + H_2$ are converted by photosynthesis in the presence of a catalyst to $CHO.H + O$, the O being removed out of the reaction system, $3CHO.H$ are converted according to photosynthesis to

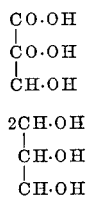

are converted by photosynthesis to

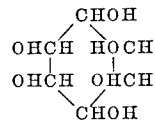

which is polymerized to polysaccharides.

*Example*

Liquefied carbon dioxide obtained by compression of purified carbon dioxide, 450 g., is placed in an iron vessel 1 and transferred into a vessel for purification of the gas 2 while controlling the gas pressure. The gas and 180 g. of water 3 vaporized in an equipment for the vaporization of water 4 are mixed with a catalyst in a mixer 5. The mixer used in the process of the present invention may be one of any conventional types. However, the one shown in FIG. 2 may be preferably used, in which the gas and water are simultaneously led into a compartment C respectively through conduits 28 and 29. They are mixed and irradiated by rays emitted from a luminous body 27 to have active properties in course of their passage from a compartment C" to C"'. And the mixture is circulated to a 1st synthesis chamber 6 through a conduit 30. The resulting mixture is circulated through a quartz pipe 7 in the 1st synthesis chamber 6 which is the chamber for the formation of intermediate corresponding to formaldehyde simultaneously the mixture is irradiated the same with a ray of wavelength between 370–150 m$\mu$ emitting electromagnetic waves produced by charging high voltage electricity into a luminous tube 8. The reaction mixture is transferred by means of a transfer pipe 8 to 2nd synthesis chamber 10 (which is the chamber for the formation of carbohydrates corresponding to aldose. There the mixture is circulated through a quartz pipe 11 while being irradiated with a ray of wavelength from 500–470 m$\mu$ to 180 m$\mu$ emitted by electric discharge of a luminous tube 12. The intermediate product thus formed is transferred through a transfer pipe 13 to a 3rd synthesis chamber 14 which is a chamber for the portion wise conversion to carbohydrates corresponding to ketose. There the intermediate product is circulated through a quartz pipe 15 while being irradiated with a ray of wavelength between 370 m$\mu$ and a 220 m$\mu$ and a ray of wavelength between 142 m$\mu$ and 112 m$\mu$ emitting electromagnetic wave emitted by charging the luminous tubes 16, 16' and 16" with high voltage electricity. The product partly consisting of carbohydrates corresponding to ketose is transferred by means of a transfer pump and of a pipe to a polymerization which is the chamber 18 (chamber for the polymerization to carmbohydrates corresponding to polysaccharide). In the polymerization chamber the product is circulated through a quartz pipe 19 while being irradiated with a ray of wavelength between 470–20 m$\mu$ emitting electromagnetic waves emitted by electric discharge of combination luminous tubes 20, 20' and 21. The final product, new starch corresponding to polysaccharide, is placed by means of a transfer pump and pipe 22 in a storage means, from which it is taken out by an outlet 23. The yield of the product is 400 g. on the solid basis.

The product obtained as described and illustrated hereinabove by the process according to the present invention is highly pure and most suitable for use as synthetic sugar, seasoning agent or confectionary. In having thus described the present invention, what I claim is:

1. A process for producing new polysaccharide-like substance which comprises
   (a) introducing and circulating a mixture of carbon dioxide and vaporized water in the presence of powdered aluminum silicate through a first syntheses chamber in the form of a highly purified quartz tube;
   (b) irradiating said tube and mixture first with a ray having a wavelength between 370–140 m$\mu$ and emitting electromagnetic waves and second with a ray having a wavelength between 270–150 m$\mu$ to form compounds with an aldehyde radical corresponding to formaldehyde;
   (c) continuously circulating the product of step (b) in the presence of aluminum silicate through a second synthesis chamber in the form of a highly purified quartz tube;
   (d) irradiating said tube and product of step (b) with a ray having a wavelength between 470–370 m$\mu$, with a ray of a wavelength between 120–60 m$\mu$ and with a ray having a wavelength between 180–112 m$\mu$ to form carbohydrates corresponding to aldose;;
   (e) continuously circulating the product of step (b) in the presence of aluminum silicate through a third synthesis chamber in the form of a highly purified quartz tube;
   (f) irradiating said tube and product of step (d) with a ray having a wavelength between 470–230 m$\mu$, with a ray having a wavelength between 120–60 m$\mu$ and with a ray having a wavelength between 180–112 m$\mu$ to form carbohydrates corresponding to ketose;
   (g) continuously circulating the product of step (f) in the presence of aluminum silicate through a synthesis chamber in the form of a highly purified quartz tube; and
   (h) irradiating said tube and product of step (f) with a ray having a wavelength between 470–20 m$\mu$ in an area having a magnetic field background to form carbohydrates belonging to macromolecular polysaccharide and corresponding to starch.

2. The process of claim 1 wherein the irradiating ray of step (b) is emitted by applying electricity of adequate high-voltage to a pure quartz luminous tube containing mercury admixed with minimum amounts of selenium, xenon and thorium sealed therein in vacuo.

3. The process of claim 1 wherein the irradiating ray of step (d) is emitted by applying electricity of adequate high-voltage to a pure quartz luminous tube containing thorium, lithium, mercury and selenium sealed therein in vacuo.

4. The process of claim 1 wherein the irradiating ray of step (f) is emitted by applying electricity of adequate high-voltage to a pure quartz luminous tube containing cadmium, mercury and germanium sealed therein in vacuo.

5. The process of claim 1 wherein the irradiating ray of step (h) is emitted by appliyng electricity of adequate high-voltage to pure quartz luminous tubes, one of which contains a mixture of potassium, mercury, thorium and argon sealed therein in vacuo and the other containing a mixture of lithium, mercury, selenium, cadmium, and xenon sealed therein in vacuo.

References Cited

The Carbohydrates, W. Pigman, editor, 1957, Academic Press, Photosynthesis and Metabolism of Carbohydrates, G. R. Noggle, pp. 733–742.

MURRAY TILLMAN, *Primary Examiner.*

SAMUEL H. BLECH, *Examiner.*

R. B. TURER, *Assistant Examiner.*